(12) United States Patent
Nagata

(10) Patent No.: US 8,907,912 B2
(45) Date of Patent: Dec. 9, 2014

(54) TOUCH PANEL AND DISPLAY DEVICE WITH A BUILT-IN TOUCH PANEL

(75) Inventor: Koji Nagata, Hachioji (JP)

(73) Assignee: Japan Display Inc., Tokyo (JP)

( * ) Notice: Subject to any disclaimer, the term of this patent is extended or adjusted under 35 U.S.C. 154(b) by 161 days.

(21) Appl. No.: 13/556,251

(22) Filed: Jul. 24, 2012

(65) Prior Publication Data

US 2013/0027330 A1 Jan. 31, 2013

(30) Foreign Application Priority Data

Jul. 28, 2011 (JP) .................................. 2011-164940

(51) Int. Cl.
*G06F 3/041* (2006.01)
(52) U.S. Cl.
CPC ...................................... *G06F 3/041* (2013.01)
USPC .......................................................... 345/173
(58) Field of Classification Search
None
See application file for complete search history.

(56) References Cited

U.S. PATENT DOCUMENTS

| 8,334,849 B2 * | 12/2012 | Murphy et al. ............... 345/174 |
| 2007/0262966 A1 | 11/2007 | Nishimura et al. |
| 2009/0213090 A1 | 8/2009 | Mamba et al. |
| 2009/0256821 A1 | 10/2009 | Mamba et al. |
| 2010/0066391 A1 | 3/2010 | Hirasaka et al. |
| 2010/0182273 A1 | 7/2010 | Noguchi et al. |
| 2011/0216031 A1 * | 9/2011 | Chen et al. .................... 345/174 |

FOREIGN PATENT DOCUMENTS

| JP | 2008-165434 | 7/2008 |
| KR | 10-2008-0061324 | 7/2008 |
| KR | 10-2010-0127164 | 12/2010 |
| TW | 200949655 | 12/2009 |
| TW | 201005614 | 2/2010 |
| TW | 201011309 | 3/2010 |

* cited by examiner

*Primary Examiner* — Adam R Giesy
(74) *Attorney, Agent, or Firm* — Antonelli, Terry, Stout & Kraus, LLP.

(57) ABSTRACT

Provided is a touch panel including: a plurality of scanning electrodes formed on a display panel; a plurality of detecting electrodes intersecting with the plurality of scanning electrodes, the plurality of detecting electrodes being formed on the display panel; a first unit for sequentially connecting a constant current source to each of the plurality of scanning electrodes for each one scanning period; and a second unit for detecting a touch position on the display panel based on a variation of a current detected at each of the plurality of detecting electrodes. One of the each of the plurality of scanning electrodes and the each of the plurality of detecting electrodes is formed on the display panel surface on a viewer side, and another of the each of the plurality of scanning electrodes and the each of the plurality of detecting electrodes is formed inside the display panel.

13 Claims, 18 Drawing Sheets

I0=I1+I2+I3+I4+I5

$I0 = I1 + I2 + I3' + I3'' + I4 + I5$

I0=I1+I2+I3+I4+I5

I0=I1+I2+I3'+I3"+I4+I5

$I0 = I1+I2+I3+I4+I5$ $I0 = I1+I2+I3'+I3''+I4+I5$

TOUCH PANEL AND DISPLAY DEVICE WITH A BUILT-IN TOUCH PANEL

CROSS-REFERENCE TO RELATED APPLICATION

The present application claims priority from Japanese application JP 2011-164940 filed on Jul. 28, 2011, the content of which is hereby incorporated by reference into this application.

BACKGROUND OF THE INVENTION

1. Field of the Invention

The present invention relates to a touch panel and a display device with a built-in touch panel, and more particularly, to a technology effectively applicable to a touch panel including scanning electrodes and detecting electrodes, which are formed on different surfaces.

2. Description of the Related Art

A display device which includes a device for inputting information by a touch operation (contact press operation; hereinafter, simply referred to as touch) onto a display screen with the use of a user's finger or a pen (hereinafter, the device is referred to also as touch sensor or touch panel) is used for mobile electronic devices such as a PDA and a mobile terminal, various home electric appliances, an automated teller machine, and other such devices. As the touch panel, there are known a resistive type touch panel that detects a change in resistance at a touched portion, a capacitance type touch panel that detects a change in capacitance, and an optical sensor type touch panel that detects a change in light intensity (US 2007/0262966).

In the capacitance type touch panel, vertical detection electrodes (X electrodes) and horizontal detection electrodes (Y electrodes) are vertically and horizontally arranged in matrix in two dimensions, and the capacitance of each electrode is detected by an input processing portion. When a conductor such as a finger contacts with the surface of the touch panel, the capacitance of each electrode increases. The input processing portion detects the increase in capacitance, and calculates input coordinates based on a signal of the capacitance change detected by each electrode.

FIGS. 1A and 1B are diagrams illustrating a conventional display device with a touch panel.

FIG. 1A is a block diagram illustrating a schematic configuration of the conventional display device with a touch panel, and FIG. 1B is a diagram illustrating a structure of the conventional display device with a touch panel.

As illustrated in FIG. 1B, a capacitance type touch panel 106 is adhered onto a display device (in this case, liquid crystal display panel) 101 with an adhesive 110. As described later, the touch panel 106 includes X electrodes and Y electrodes for capacitance detection.

The touch panel 106 is arranged in front of the display panel 101. Therefore, in order to enable an image displayed on the display panel 101 to be viewed by a user, the displayed image is required to transmit the touch panel 106. Therefore, the touch panel 106 is desired to have a high light transmittance.

The X electrodes and the Y electrodes of the touch panel 106 are connected to a touch panel control portion 108 through wiring 107.

The touch panel control portion 108 sets the Y electrodes as scanning electrodes and sequentially applies a drive voltage thereto, and sets the X electrodes as detecting electrodes to measure interelectrode capacitances at respective electrode intersections. The touch panel control portion 108 calculates and determines input coordinates from capacitance detection signals which vary depending on capacitance values of the respective electrode intersections.

The touch panel control portion 108 uses an I/F signal 109 to transfer the input coordinates to a system control portion 105.

When the input coordinates are transferred from the touch panel 106 by a touch operation, the system control portion 105 generates a display image in accordance with the touch operation, and transfers the generated display image to a display control circuit 103 as a display control signal 104.

The display control circuit 103 generates a display signal 102 in accordance with the display image transferred by the display control signal 104, to thereby display an image on the display panel 101.

Note that, any display panel can be used as long as the display panel can be used with the touch panel 106, and the display panel is not limited to a liquid crystal display panel. Alternatively, it is possible to use a display panel which uses an organic light emitting diode element or a surface-conduction electron emitter, or an organic EL display panel.

When a liquid crystal display panel is used as the display panel 101, the display panel 101 includes a backlight unit (not shown) arranged below a surface of the liquid crystal display panel on a side opposite to the viewer side. The liquid crystal display panel used in this case is, for example, an IPS type, TN type, or VA type liquid crystal display panel.

As is well known, the liquid crystal display panel is formed by adhering two substrates arranged opposed to each other, and polarizing plates are provided on outer sides of the two substrates, respectively.

FIGS. 2A and 2B are diagrams illustrating the touch panel 106.

FIG. 2A is a diagram illustrating an electrode pattern of the touch panel 106, and FIG. 2B is a sectional view illustrating a sectional structure taken along the cut-line IIB-IIB of FIG. 2A.

As illustrated in FIG. 2A, the touch panel 106 includes X electrodes 201 and Y electrodes 202 for capacitance detection. In this case, for example, five X electrodes 201 and six Y electrodes 202 are illustrated, but the number of the electrodes is not limited thereto.

FIG. 2B illustrates a touch panel substrate 204 formed of a glass substrate, a PET film, or the like. In the touch panel 106, the X electrodes 201 and the Y electrodes 202 are formed on the touch panel substrate 204, and a protective film 203 is formed on the X electrodes 201 and the Y electrodes 202. Further, in FIG. 2B, a shielding electrode 205 is formed on a surface of the touch panel substrate 204 on the display panel side.

FIGS. 3A and 3B are diagrams illustrating a conventional display device with a built-in touch panel.

FIG. 3A is a block diagram illustrating a schematic configuration of the conventional display device with a built-in touch panel, and FIG. 3B is a diagram illustrating a sectional structure of the conventional display device with a built-in touch panel.

As illustrated in FIG. 3B, a capacitance type touch panel 301 is formed inside a display device (in this case, liquid crystal display panel) 101. Other configurations are the same as those of FIG. 1A, and hence repetition of detailed description thereof is omitted. FIGS. 4A and 4B are diagrams illustrating the touch panel 301. FIG. 4A is a diagram illustrating an electrode pattern of the touch panel 301, and FIG. 4B is a sectional view illustrating a sectional structure taken along the cut-line IVB-IVB of FIG. 4A.

As illustrated in FIG. 4A, the touch panel 301 includes X electrodes 201 and Y electrodes 202 for capacitance detection. In this case, for example, five X electrodes 201 and six Y electrodes 202 are illustrated, but the number of the electrodes is not limited thereto.

FIG. 4B illustrates a first substrate 211, a second substrate 212, a lower polarizing plate 213, an upper polarizing plate 214, a liquid crystal layer 215, and a sealing member 216. As illustrated in FIG. 4B, the X electrodes 201 and the Y electrodes 202 are formed at different parts of the structural members of the liquid crystal display panel.

Note that, the first substrate 211 and the second substrate 212 are desired to have a high light transmittance.

Further, generally, in an IPS type liquid crystal display panel, on a surface of the first substrate 211 on the liquid crystal layer side, there are formed, in the order from the first substrate 211 toward the liquid crystal layer 215, scanning lines (also referred to as gate lines), an interlayer insulating film, video lines (also referred to as source lines or drain lines), thin film transistors (TFTs), pixel electrodes, an interlayer insulating film, counter electrodes (also referred to as common electrodes), and an alignment film. In FIG. 4B, however, illustration of those members is omitted.

Further, on a surface of the second substrate 212 on the liquid crystal layer side, there are formed, in the order from the second substrate 212 toward the liquid crystal layer 215, alight shielding film, color filters of red, green, and blue, a planarization film, and an alignment film. In FIG. 4B, however, illustration of those members is omitted.

In the structure of FIG. 4B, a back electrode formed on a surface of the second substrate on a side opposite to the liquid crystal layer doubles as the X electrode 201, and the counter electrode doubles as the Y electrode 202.

FIGS. 5A to 5C are diagrams illustrating a conventional detection method for the touch panel 106. FIG. 5A is a diagram illustrating a state in which a touch operation is not performed, FIG. 5B is a diagram illustrating a state in which a finger 502 has approached the touch panel 106, and FIG. 5C is a graph showing variations of detected signals.

One of the X electrode 201 and the Y electrode 202 (in this case, the Y electrode 202) is connected to a voltage source 504 so that a pulse is input thereto from the voltage source 504. A transient current associated with the pulse input from the voltage source 504 is detected by a detection circuit (505, 506) via the other electrode at which capacitive coupling occurs (in this case, the X electrode 201). As illustrated in FIG. 5A, the capacitive coupling forms lines 501 of electric force between the X electrode and the Y electrode.

As illustrated in FIG. 5B, when the finger 502 approaches the touch panel 106, the lines 501 of electric force are blocked. With this, the transient current is reduced.

As shown in FIG. 5C, when a change occurs from the state of FIG. 5A to the state of FIG. 5B, a signal 507 corresponding to a part closest to the finger 502 is significantly lowered. A reduction amount 503 indicates signal intensity. At a part far from the finger, a variation 508 is minute.

FIGS. 6A to 6C are diagrams illustrating a conventional detection method for the touch panel 301. FIG. 6A is a diagram illustrating a state in which a touch operation is not performed, FIG. 6B is a diagram illustrating a state in which a finger 502 has approached the touch panel 106, and FIG. 6C is a graph showing variations of detected signals.

As illustrated in FIG. 6A, one of the X electrode 201 and the Y electrode 202 (in this case, the Y electrode 202) is connected to a voltage source 504 so that a pulse is input thereto from the voltage source 504. A transient current associated with the pulse input from the voltage source 504 is detected by a detection circuit (505, 506) via the other electrode at which capacitive coupling occurs (in this case, the X electrode 201). As illustrated in FIG. 6A, the capacitive coupling forms lines 601 of electric force between the X electrode and the Y electrode. However, compared to the case where the X electrodes 201 and the Y electrodes 202 are present on the same surface as illustrated in FIG. 5B, an amount of the lines 601 of electric force generated outside the display panel is smaller.

As illustrated in FIG. 6B, when the finger 502 approaches the touch panel 301, the lines 601 of electric force are blocked. With this, the transient current is reduced.

However, compared to the case where the X electrodes 201 and the Y electrodes 202 are present on the same surface as illustrated in FIG. 5B, the amount of the lines 601 of electric force generated outside the display panel is smaller, and hence the reduction rate is smaller.

As shown in FIG. 6C, when a change occurs from the state of FIG. 6A to the state of FIG. 6B, a signal 603 corresponding to a part closest to the finger 502 is slightly lowered, but signal intensity is minute. This causes a reduction in detection sensitivity.

FIGS. 7A and 7B are diagrams illustrating visibility (electrode appearance) of the X electrode and the Y electrode in the touch panel 106 and the touch panel 301.

FIG. 7A is a diagram illustrating visibility (electrode appearance) of the X electrode and the Y electrode in the electrode structure of the touch panel 106, and FIG. 7B is a diagram illustrating visibility (electrode appearance) of the X electrode and the Y electrode in the electrode structure of the touch panel 301.

As illustrated in FIG. 7A, in the electrode structure of the touch panel 106, an electrode interval 701 is fine and cannot be easily observed visibly.

As illustrated in FIG. 7B, in the electrode structure of the touch panel 301, an electrode interval 702 is enlarged and can be easily observed visibly.

In the conventional touch panels, for example, when the X electrodes and the Y electrodes are formed on different surfaces and the electrode interval is increased, as in the case of a display device with a built-in touch panel in which a touch panel is built into a display panel, there have been problems in that the detection sensitivity reduces and that the X electrodes and the Y electrodes may be easily observed visibly from the viewer.

When the X electrodes and the Y electrodes are formed on different surfaces and the X electrodes as well as the Y electrodes are densely arranged, the intervals between the X electrodes and between the Y electrodes become fine, and thus the X electrodes and the Y electrodes may not be easily observed visibly from the viewer. In this manner, it is possible to solve the problem in that the X electrodes and the Y electrodes may be easily observed visibly from the viewer.

However, when the X electrodes and the Y electrodes are formed on different surfaces and the X electrodes as well as the Y electrodes are densely arranged, there has been a problem in that it becomes impossible to apply a conventional mutual capacitance detection method (that is, a method of detecting an influence of blocking an electric field between the X electrode and the Y electrode by the finger).

The present invention has been made to solve the above-mentioned problems of the conventional technology, and it is an object of the present invention to provide a touch panel and a display device with a built-in touch panel, which adopt a novel detection method different from a conventional mutual capacitance detection method.

SUMMARY OF THE INVENTION

The above-mentioned and other objects and novel features of the present invention are made clear from the following description of the subject specification and the accompanying drawings.

Exemplary embodiments of the invention disclosed herein are briefly outlined as follows.

(1) A touch panel, including: a plurality of scanning electrodes; a plurality of detecting electrodes intersecting with the plurality of scanning electrodes; first means for sequentially connecting a constant current source to each of the plurality of scanning electrodes for each one scanning period; and second means for detecting a touch position on the touch panel based on a variation of a current detected at each of the plurality of detecting electrodes.

(2) In the touch panel according to the above-mentioned item (1), the plurality of scanning electrodes and the plurality of detecting electrodes are formed on different surfaces.

(3) In the touch panel according to the above-mentioned item (1), in which the plurality of scanning electrodes and the plurality of detecting electrodes are formed on different surfaces across an insulating member.

(4) In the touch panel according to any one of the above-mentioned items (1) to (3), the plurality of scanning electrodes and the plurality of detecting electrodes are each a stripe-type electrode.

(5) In the touch panel according to the above-mentioned item (4), an electrode interval between the plurality of scanning electrodes and an electrode interval between the plurality of detecting electrodes are each 20 µm or more and 30 µm or less.

(6) The touch panel according to anyone of the above-mentioned items (1) to (5) further includes third means for adjusting a frequency of the constant current source.

(7) A display device with a built-in touch panel, including: a display panel; and a touch panel built into the display panel, in which the touch panel includes: a plurality of scanning electrodes formed on the display panel; a plurality of detecting electrodes intersecting with the plurality of scanning electrodes, the plurality of detecting electrodes being formed on the display panel; first means for sequentially connecting a constant current source to each of the plurality of scanning electrodes for each one scanning period; and second means for detecting a touch position on the display panel based on a variation of a current detected at each of the plurality of detecting electrodes.

(8) In the display device with a built-in touch panel according to the above-mentioned item (7), the plurality of scanning electrodes and the plurality of detecting electrodes are formed on different surfaces.

(9) In the display device with a built-in touch panel according to the above-mentioned item (7), one of the each of the plurality of scanning electrodes and the each of the plurality of detecting electrodes is formed on a surface of the display panel on a viewer side, and another of the each of the plurality of scanning electrodes and the each of the plurality of detecting electrodes is formed inside the display panel.

(10) In the display device with a built-in touch panel according to the above-mentioned item (7), the display panel is a liquid crystal display panel including: a first substrate; a second substrate; and a liquid crystal layer sandwiched between the first substrate and the second substrate, the second substrate is arranged on a viewer side, one of the each of the plurality of scanning electrodes and the each of the plurality of detecting electrodes is formed on a surface of the second substrate on a side opposite to the liquid crystal layer, and another of the each of the plurality of scanning electrodes and the each of the plurality of detecting electrodes is formed on a surface of the first substrate on the liquid crystal layer side.

(11) In the display device with a built-in touch panel according to any one of the above-mentioned items (7) to (10), the plurality of scanning electrodes and the plurality of detecting electrodes are each a stripe-type electrode.

(12) In the display device with a built-in touch panel according to the above-mentioned item (11), an electrode interval between the plurality of scanning electrodes and an electrode interval between the plurality of detecting electrodes are each 20 µm or more and 30 µm or less.

(13) The display device with a built-in touch panel according to anyone of the above-mentioned items (7) to (12) further includes third means for adjusting a frequency of the constant current source.

An effect obtained by the exemplary embodiments of the invention disclosed herein is briefly described as follows.

According to the exemplary embodiments of the present invention, it is possible to provide the touch panel and the display device with a built-in touch panel, which adopt a novel detection method different from the conventional mutual capacitance detection method.

DETAILED DESCRIPTION OF THE INVENTION

Hereinafter, an embodiment of the present invention is described in detail with reference to the accompanying drawings.

Note that, throughout the drawings illustrating the embodiment, the same reference symbol is given to components having the same function, and repeated description thereof is omitted. Also note that, the following embodiment is not intended to limit the interpretation of the scope of claims of the present invention.

(Feature of Touch Panel of Embodiment of the Present Invention)

Figure 1A:
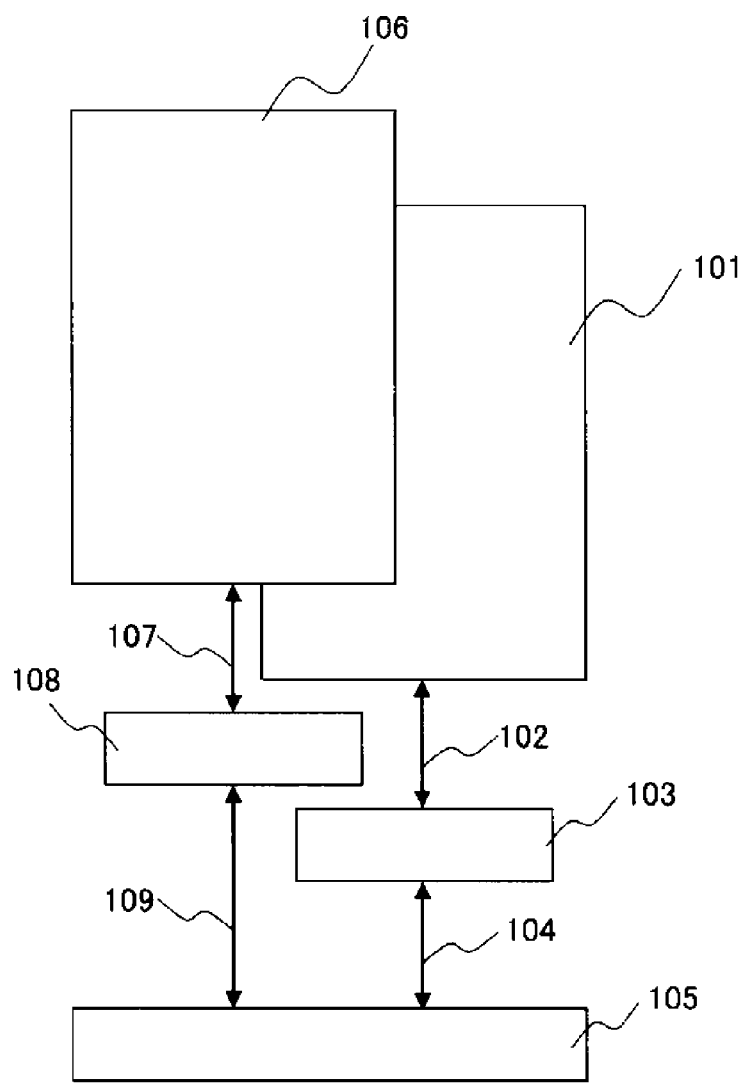
FIGS. 1A and 1B are diagrams illustrating a conventional display device with a touch panel.
Figure 1B:
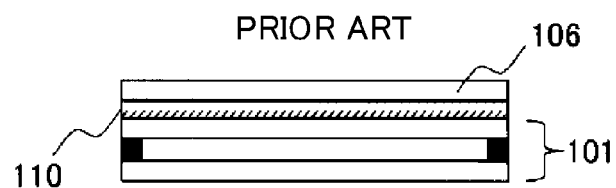
Figure 2A:
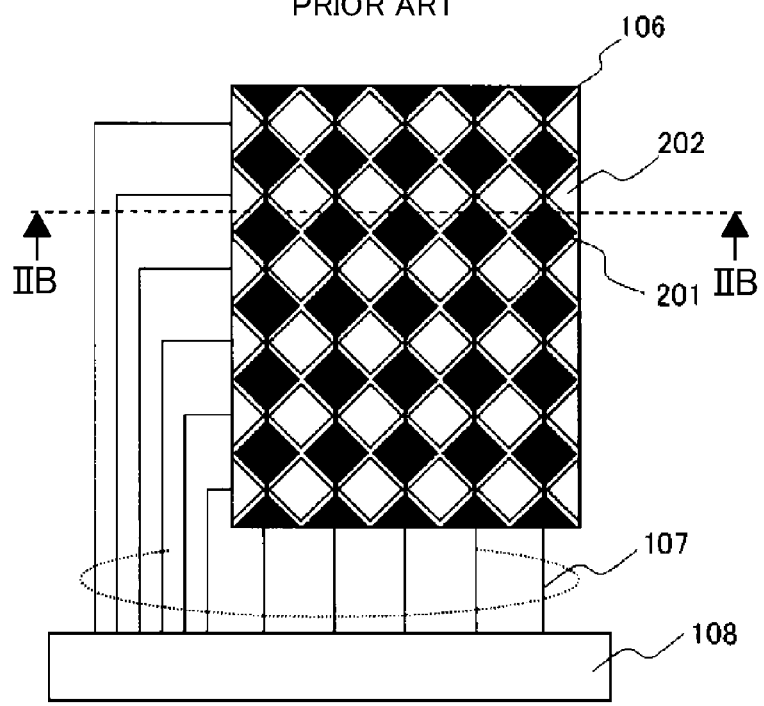
FIGS. 2A and 2B are diagrams illustrating the touch panel illustrated in FIGS. 1A and 1B.
Figure 2B:
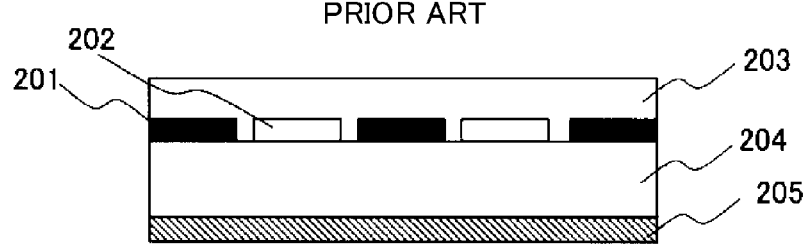
Figure 3A:
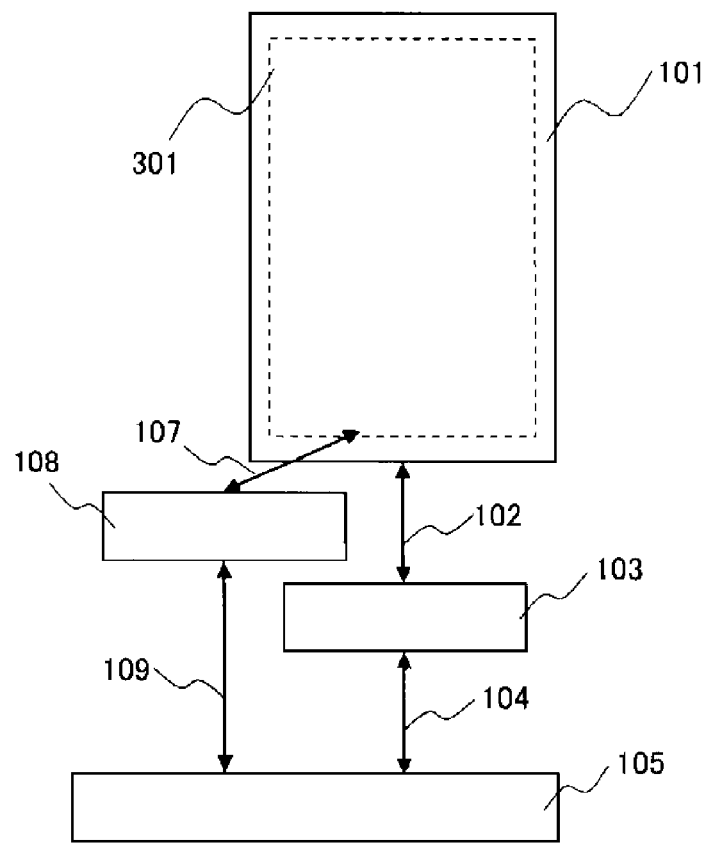
FIGS. 3A and 3B are diagrams illustrating a conventional display device with a built-in touch panel.
Figure 3B:
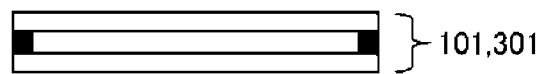
Figure 4A:
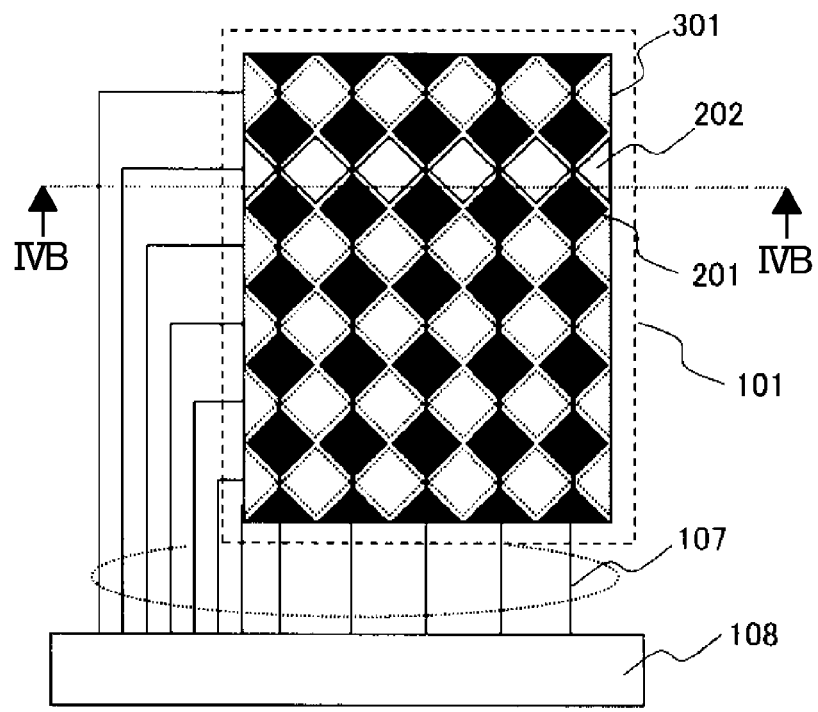
FIGS. 4A and 4B are diagrams illustrating the touch panel illustrated in FIGS. 3A and 3B.
Figure 4B:
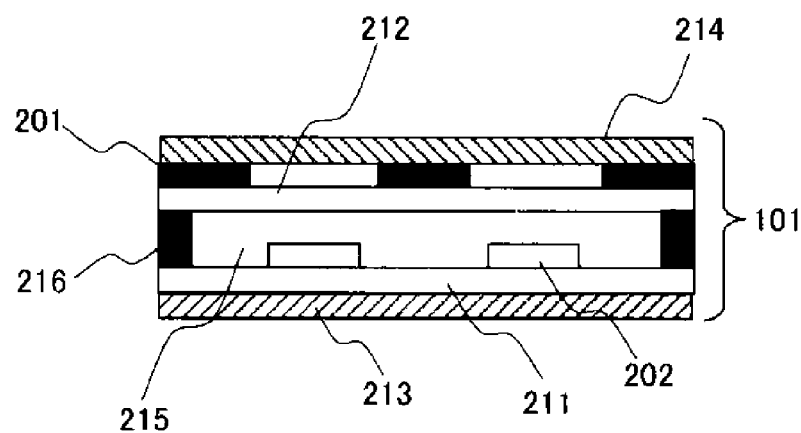
Figure 5A:
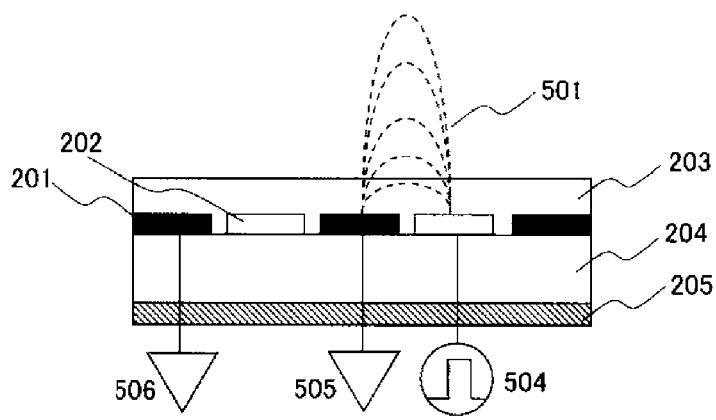
FIGS. 5A to 5C are diagrams illustrating a conventional detection method for the touch panel illustrated in FIGS. 1A and 1B.
Figure 5B:
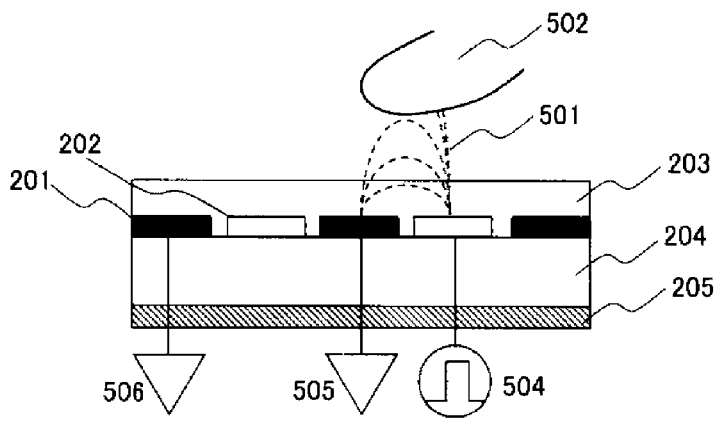
Figure 5C:
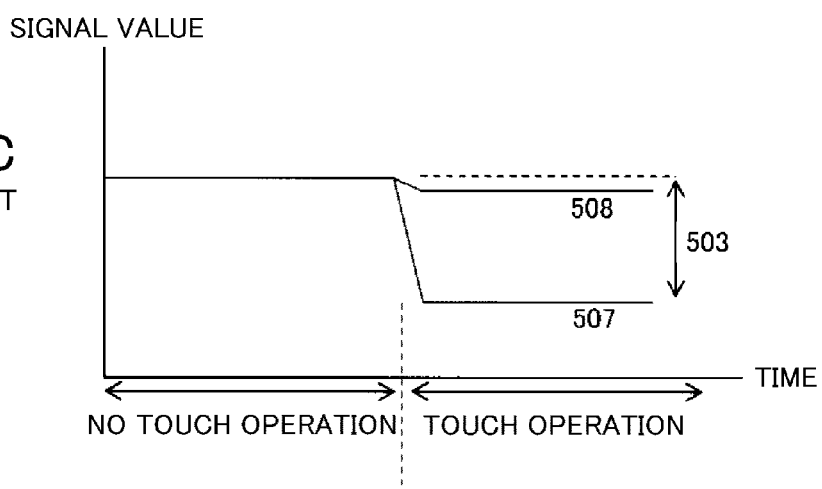
Figure 6A:
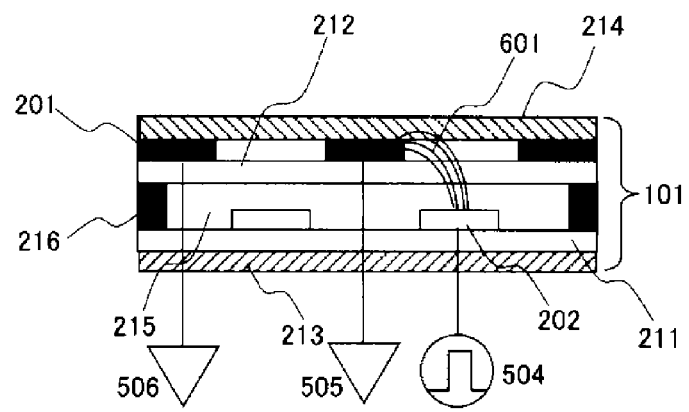
FIGS. 6A to 6C are diagrams illustrating a conventional detection method for the touch panel illustrated in FIGS. 3A and 3B.
Figure 6B:
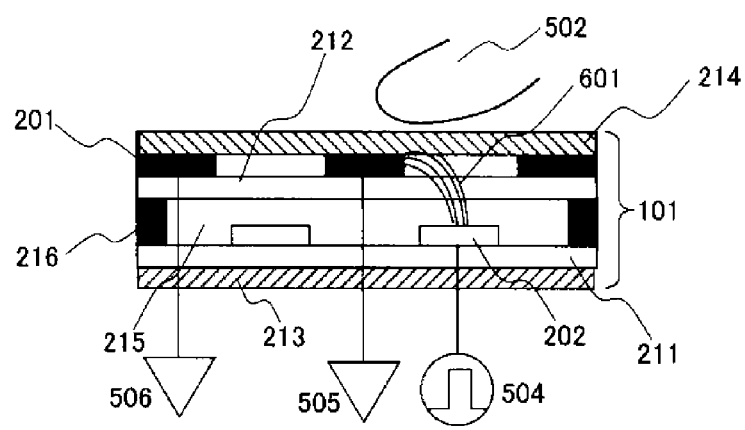
Figure 6C:
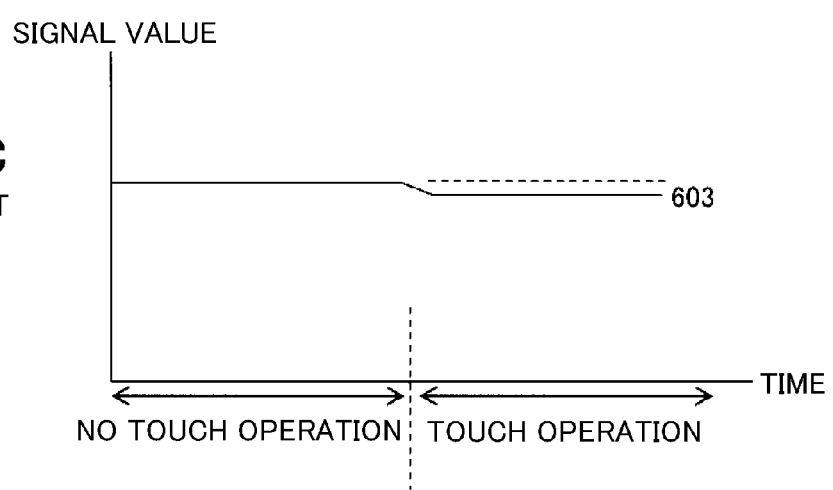
Figure 7A:
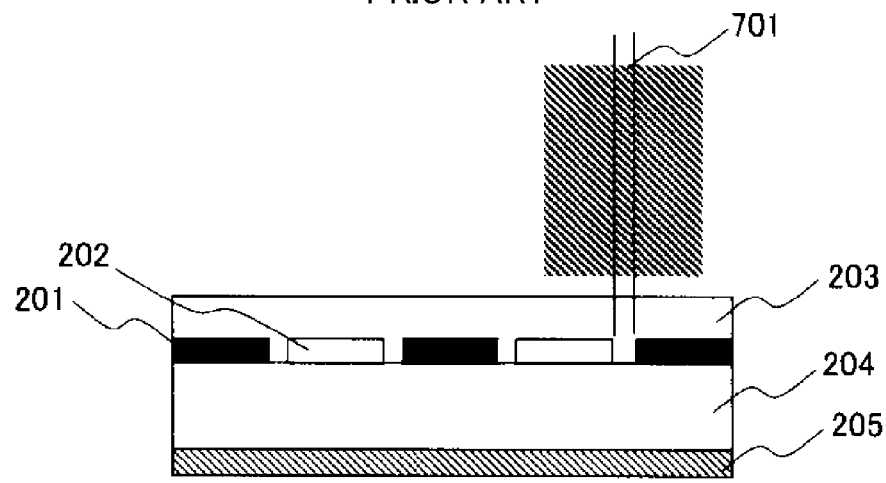
FIGS. 7A and 7B are diagrams illustrating visibility of an X electrode and a Y electrode in the touch panel illustrated in FIGS. 1A and 1B and the touch panel illustrated in FIGS. 3A and 3B.
Figure 7B:
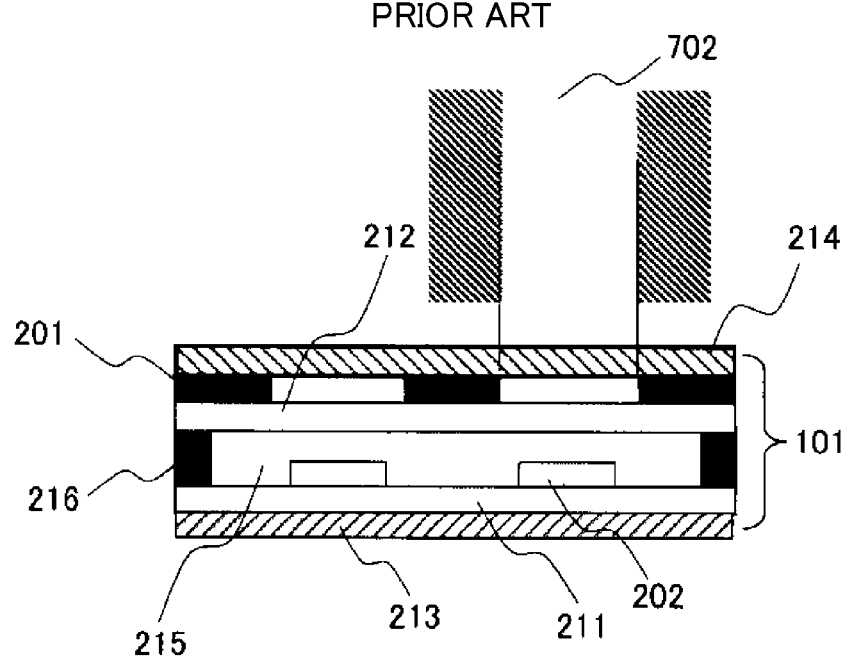
Figure 8A:
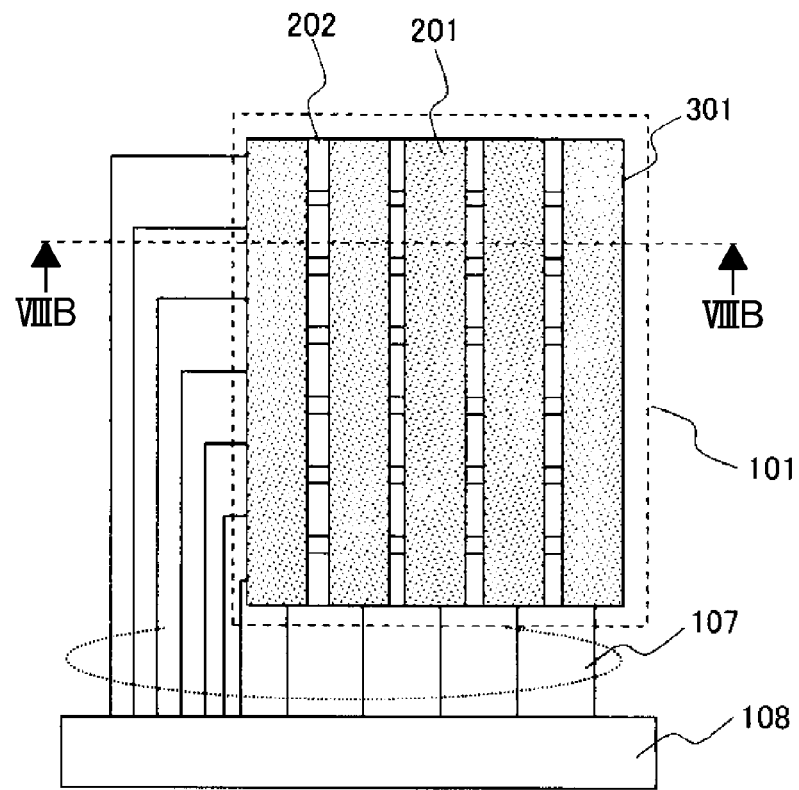
FIGS. 8A and 8B are diagrams illustrating an electrode structure of a touch panel in a display device with a built-in touch panel according to an embodiment of the present invention.
Figure 8B:
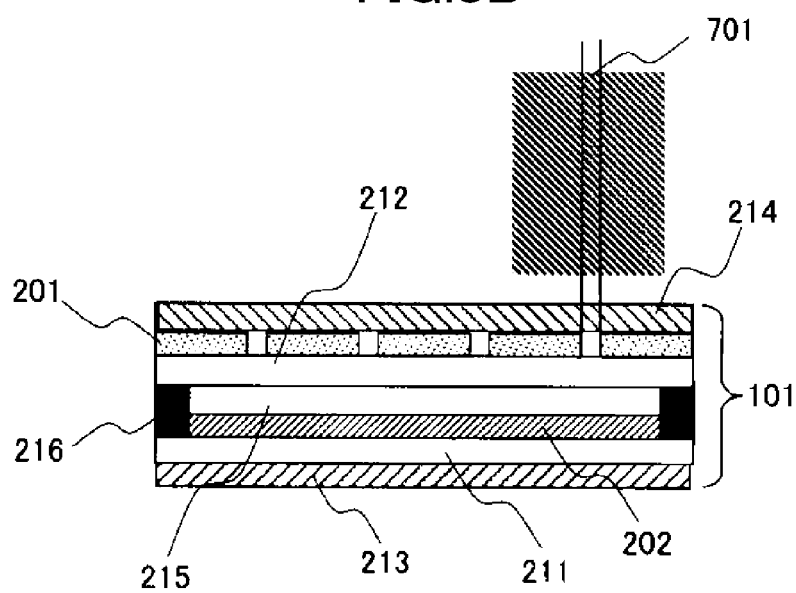

FIGS. 8A and 8B are diagrams illustrating a touch panel 301 in a display device with a built-in touch panel according to the embodiment of the present invention.

FIG. 8A is a diagram illustrating an electrode pattern of the touch panel 301 of this embodiment, and FIG. 8B is a sectional view illustrating a sectional structure taken along the cut-line VIIIB-VIIIB of FIG. 8A.

In the touch panel 301 of this embodiment, an X electrode 201 and a Y electrode 202 are each formed into a stripe shape, and a plurality of the Y electrodes 202 are arranged so as to intersect with a plurality of the X electrodes 201.

Also in this embodiment, a back electrode formed on a surface of a second substrate on a side opposite to a liquid crystal layer doubles as the X electrode 201, and a counter electrode doubles as the Y electrode 202.

As illustrated in FIG. 8A, in the electrode structure of the touch panel 301 of this embodiment, an electrode interval 701 is set fine and the electrodes are densely arranged. Therefore, in the electrode structure of the touch panel 301 of this embodiment, the electrode interval 701 cannot be easily observed visibly because the electrode interval 701 is fine similarly to the case of the touch panel 106 of the conventional technology.

Here, when the electrode interval 701 is 30 μm, the interval can be slightly observed, and the interval becomes nearly invisible when the electrode interval 701 is about 20 μm.

Figure 9A:
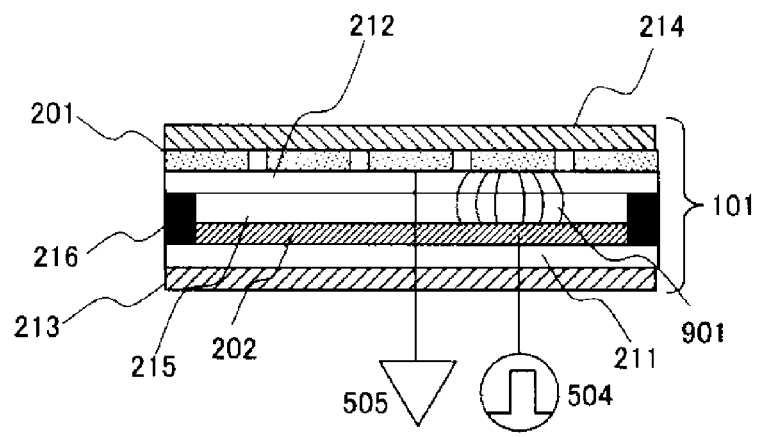
FIGS. 9A to 9C are diagrams illustrating a problem which occurs when the touch panel of the embodiment of the present invention is combined with the conventional detection method.
Figure 9B:
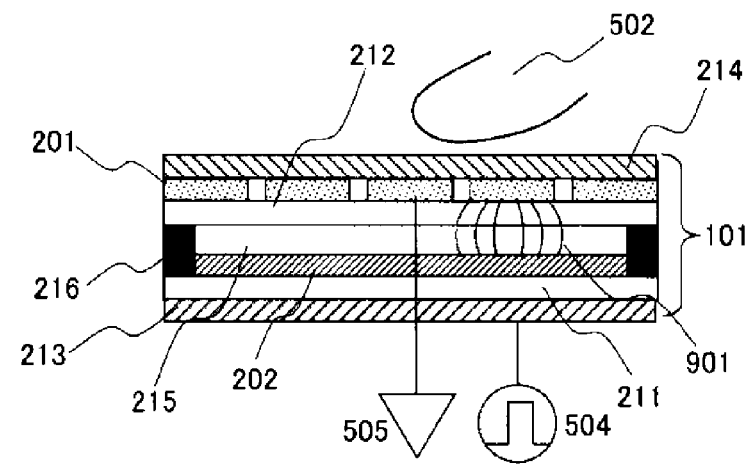
Figure 9C:
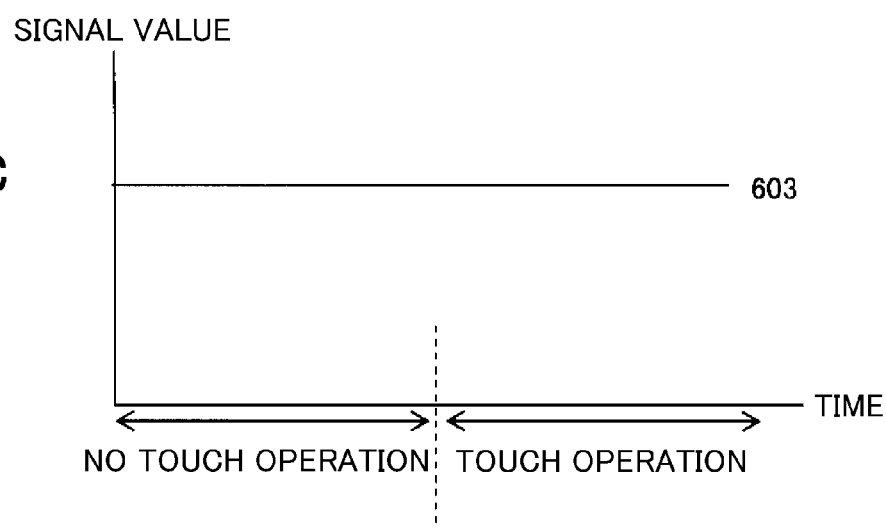

FIGS. 9A to 9C are diagrams illustrating a problem which occurs when the touch panel 301 of the embodiment of the present invention is combined with a conventional detection method.

FIG. 9A is a diagram illustrating a state in which a touch operation is not performed, FIG. 9B is a diagram illustrating a state in which a finger 502 has approached the touch panel 301, and FIG. 9C is a graph showing a variation of a detected signal.

As illustrated in FIG. 9A, a voltage source 504 is connected to the Y electrode 202, and a detection circuit 505 is connected to the X electrode 201. A pulse input from the voltage source 504 forms an electric field between the X electrode 201 and the Y electrode 202. However, the X electrodes 201 are densely arranged, and hence lines 901 of electric force do not leak outside.

As illustrated in FIG. 9B, even when the finger 502 approaches the touch panel 301 of this embodiment, there is almost no interactions between the finger 502 and the lines 901 of electric force.

Therefore, as shown in FIG. 9C, even when the change occurs from the state of FIG. 9A to the state of FIG. 9B, a signal 603 detected by the detection circuit 505 does not vary, and the touch operation cannot be detected.

Figure 10A:
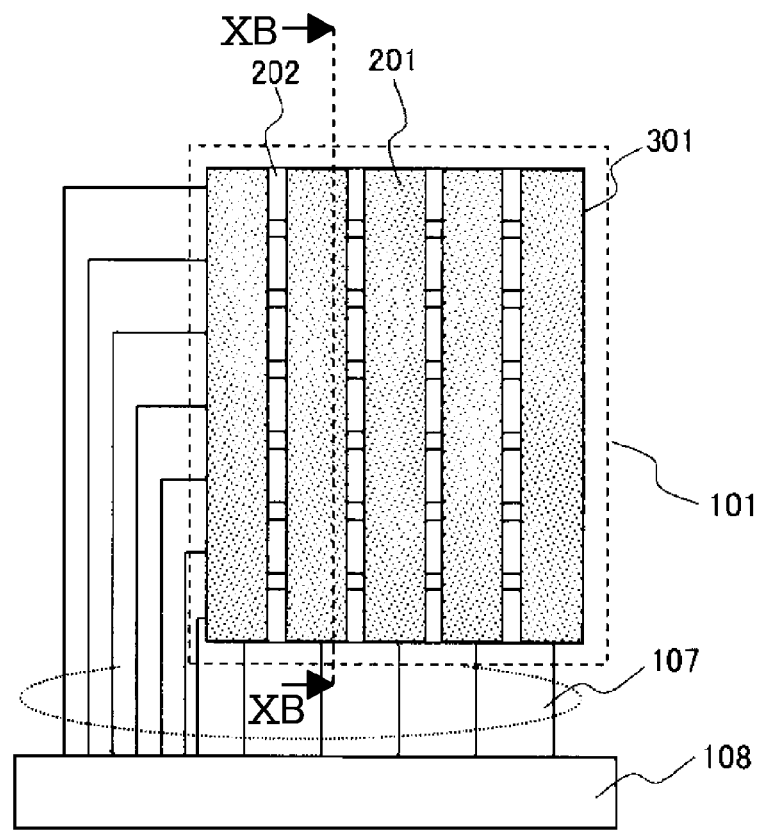
FIGS. 10A and 10B are diagrams illustrating an electrode structure of the touch panel of the display device with a built-in touch panel according to the embodiment of the present invention.
Figure 10B:
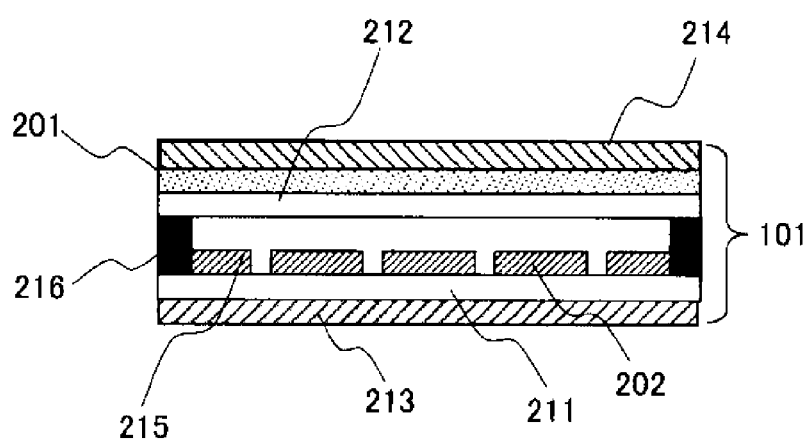

FIGS. 10A and 10B are diagrams illustrating an electrode structure of the touch panel 301 of the display device with a built-in touch panel according to the embodiment of the present invention.

FIG. 10A is a diagram illustrating an electrode pattern of the touch panel 301 of this embodiment, and FIG. 10B is a sectional view illustrating a sectional structure taken along the cut-line XB-XB of FIG. 10A.

The electrode pattern of the touch panel 301 of this embodiment illustrated in FIG. 10A is the same as the electrode pattern illustrated in FIG. 8A. However, the segment for obtaining the sectional structure illustrated in FIG. 10B is set parallel to the X electrode 201.

Figure 11A:
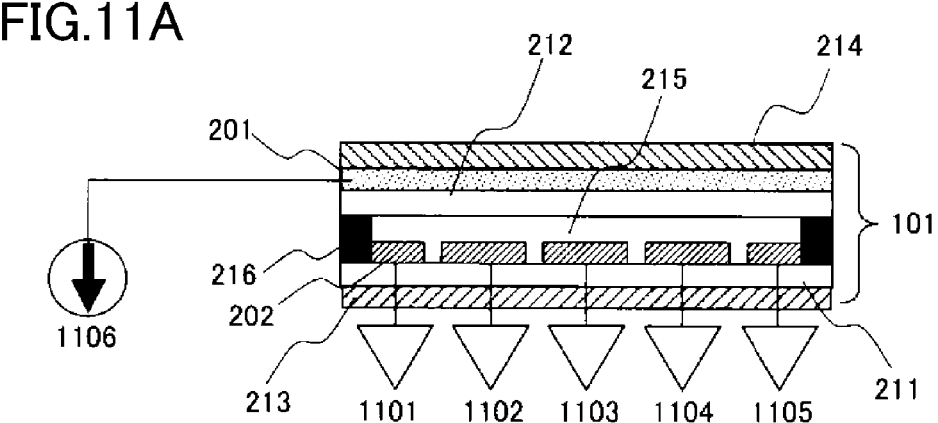
FIGS. 11A to 11C are diagrams illustrating a detection method for the touch panel of the embodiment of the present invention.
Figure 11B:
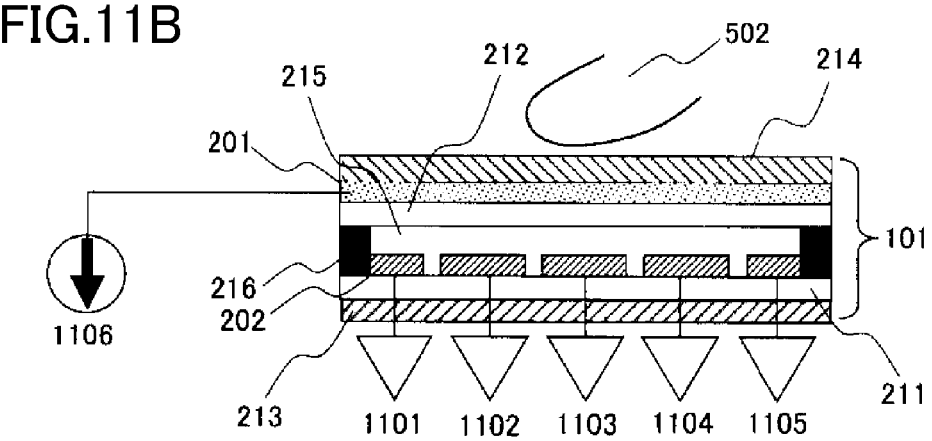
Figure 11C:
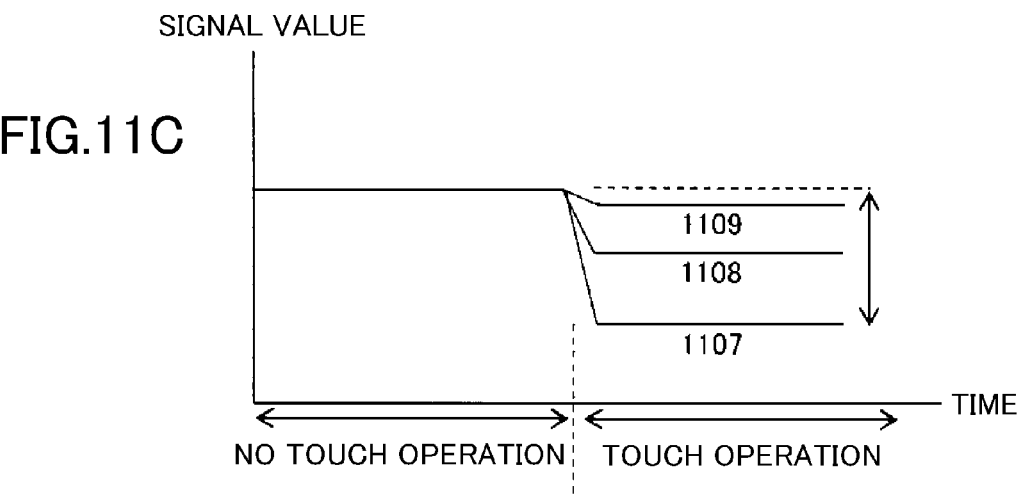

FIGS. 11A to 11C are diagrams illustrating a detection method for the touch panel 301 of the embodiment of the present invention.

FIG. 11A is a diagram illustrating a state in which a touch operation is not performed, FIG. 11B is a diagram illustrating a state in which the finger 502 has approached the touch panel 301, and FIG. 11C is a graph showing variations of detected signals.

As illustrated in FIG. 11A, in the detection method of this embodiment, one of the X electrode 201 and the Y electrode 202 (in this case, the X electrode 201) is connected to a constant current source 1106. On the other hand, another of the X electrode 201 and the Y electrode 202 (in this case, the Y electrode 202) is each connected to a detection circuit (1101 to 1105).

In the touch panel 301 of this embodiment, the constant current source 1106 is used as a detection signal source. With use of the constant current source 1106, regardless of the state of the touch panel 301, a constant current flows through each X electrode 201.

As illustrated in FIG. 11B, when the finger 502 approaches the touch panel 301, a current passage is added to the touch panel 301, but the current is constant, and hence the current in other passages reduce by an amount of current flowing through the added current passage. This phenomenon becomes remarkable in a passage connected to a position close to the finger 502.

Therefore, as shown in FIG. 11C, of detection signals 1107 to 1109, the detection signal 1107 of the detection circuit 1103 reduces in a greatest amount, and thus the contact position of the finger 502 can be determined.

FIG. 12A to FIG. 14C are diagrams illustrating a detection principal of the touch panel 301 of the embodiment of the present invention.

Figure 12A:
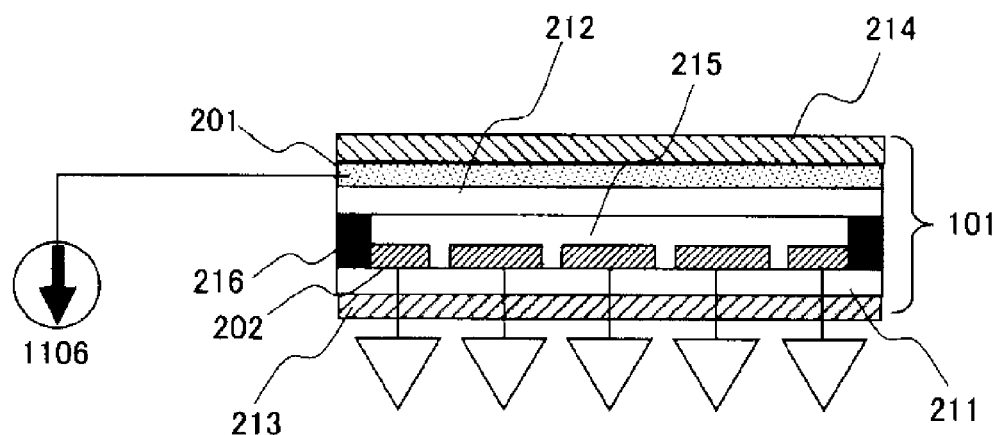
FIGS. 12A and 12B are diagrams illustrating a detection principal of the touch panel of the embodiment of the present invention.
Figure 13A:
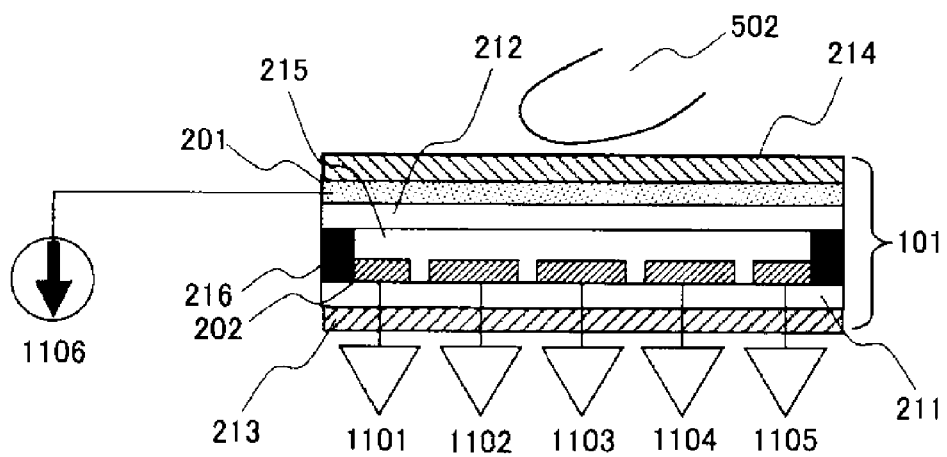
FIGS. 13A and 13B are diagrams illustrating the detection principle of the touch panel of the embodiment of the present invention.

FIG. 12A and FIG. 13A are diagrams illustrating an electrode structure of the touch panel 301 of the embodiment of the present invention, and a connection relationship of the constant current source 1106 and the detection circuits (1101 to 1105).

Figure 12B:
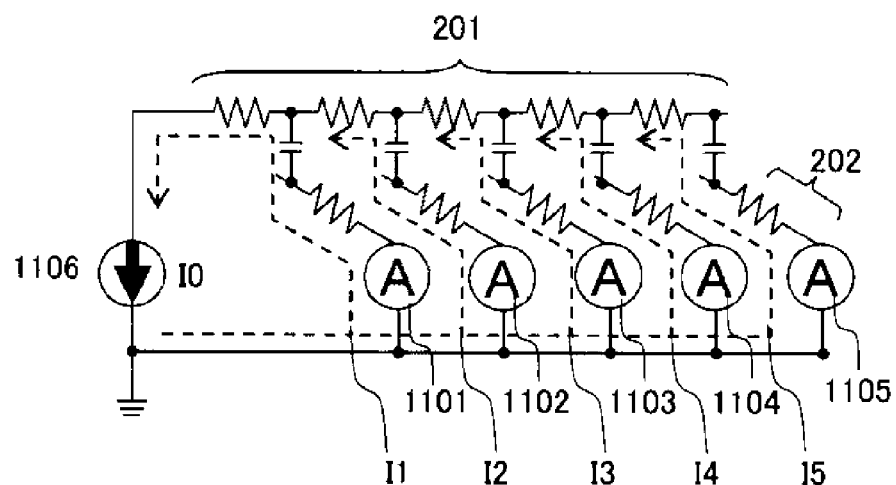

FIG. 12B is a circuit diagram illustrating an equivalent circuit of the touch panel 301 of the embodiment of the present invention in a state in which a touch operation is not performed.

Figure 13B:
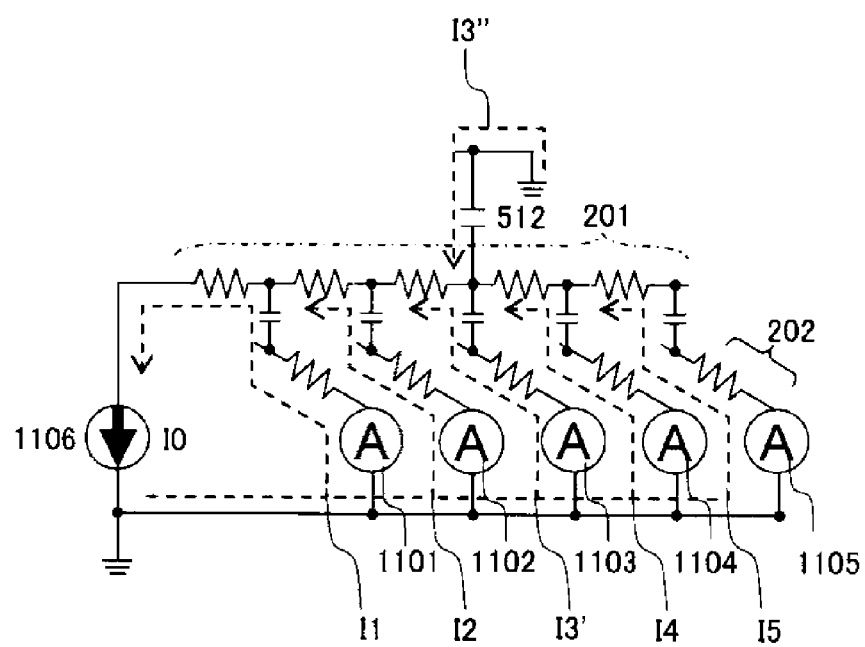

FIG. 13B is a circuit diagram illustrating an equivalent circuit of the touch panel 301 of the embodiment of the present invention in a state in which the finger 502 has approached the touch panel 301.

Figure 14A:
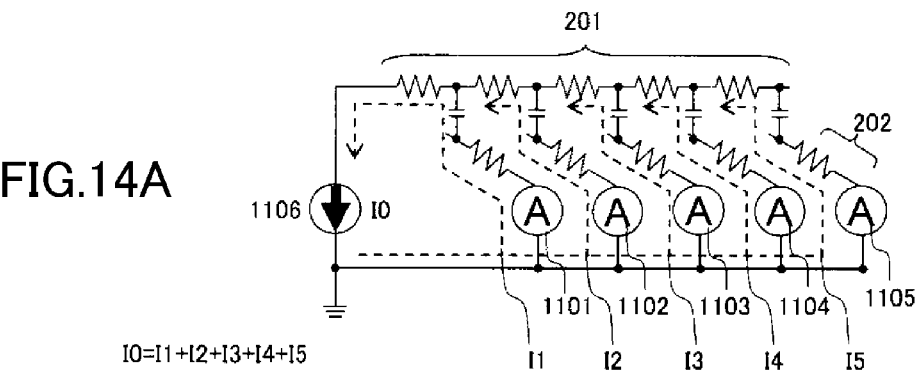
FIGS. 14A to 14C are diagrams illustrating the detection principle of the touch panel of the embodiment of the present invention.

FIG. 14A is a circuit diagram illustrating the equivalent circuit of the touch panel 301 of the embodiment of the present invention in the state in which a touch operation is not performed, and is the same diagram as that of FIG. 12B.

Figure 14B:
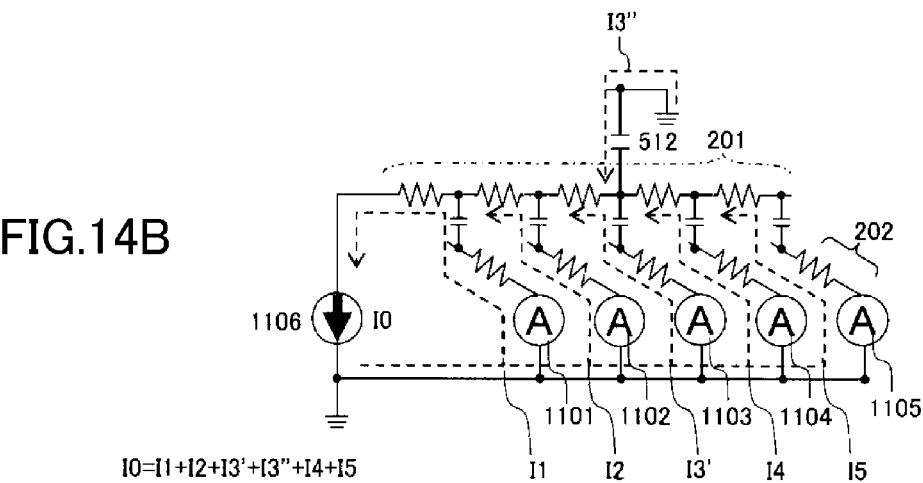

FIG. 14B is a circuit diagram illustrating the equivalent circuit of the touch panel 301 of the embodiment of the present invention in the state in which the finger 502 has approached the touch panel 301, and is the same diagram as that of FIG. 13B.

Figure 14C:
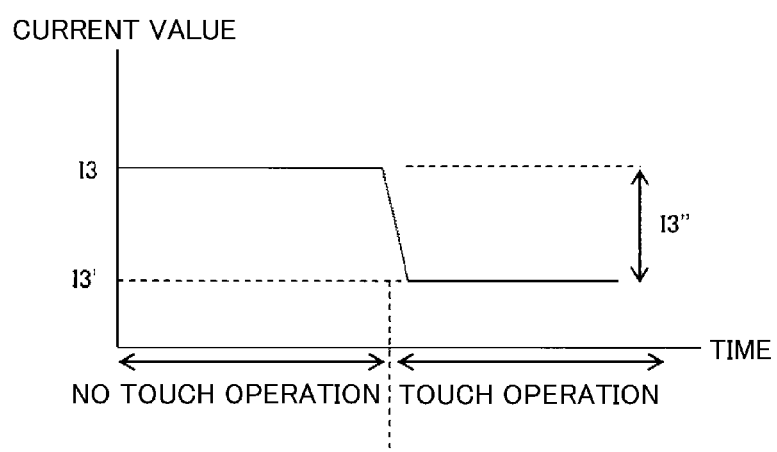

FIG. 14C is a graph showing a variation of a current which occurs along with a change from the state of FIG. 14A to the state of FIG. 14B.

A total current amount (I0) to be generated by the constant current source 1106 is constant regardless of the state of the touch panel 301. Therefore, as illustrated in FIG. 12B, in the state in which a touch operation is not performed to the touch panel 301, the total current amount (I0) to be generated by the constant current source 1106 becomes a sum of the currents (I1 to I5) flowing through the detection circuits 101 to 1105 (I0=I1+I2+I3+I4+I5).

Further, as illustrated in FIG. 13B, in the equivalent circuit in the state in which the finger 502 has approached the touch panel 301, the finger 502 that has approached the touch panel 301 is represented by a capacitance 512. This becomes a new current passage (current amount I3") with respect to the constant current source 1106.

However, the total current amount to be generated by the constant current source 1106 does not vary. Therefore, as shown in the graph of FIG. 14C, the current flowing through the existing current passage, which is connected to a point to which the capacitance 512 of the finger 502 connects, is reduced by the amount of the new current (I3") to become I3'.

Figure 15A:
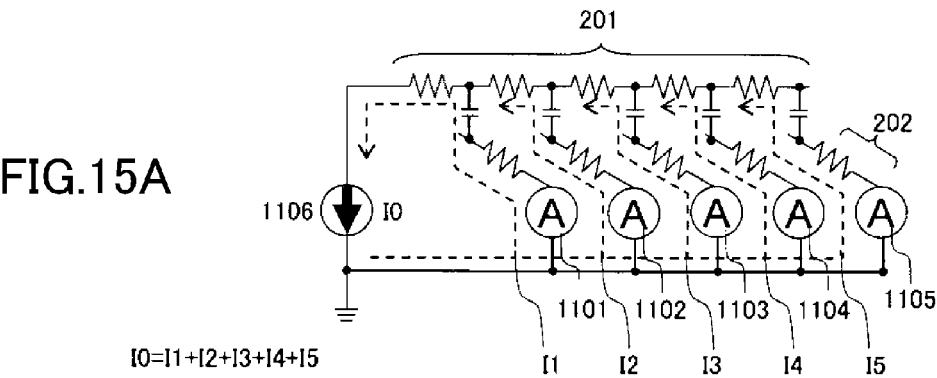
FIGS. 15A to 15C are diagrams illustrating the detection principle of the touch panel of the embodiment of the present invention.
Figure 15B:
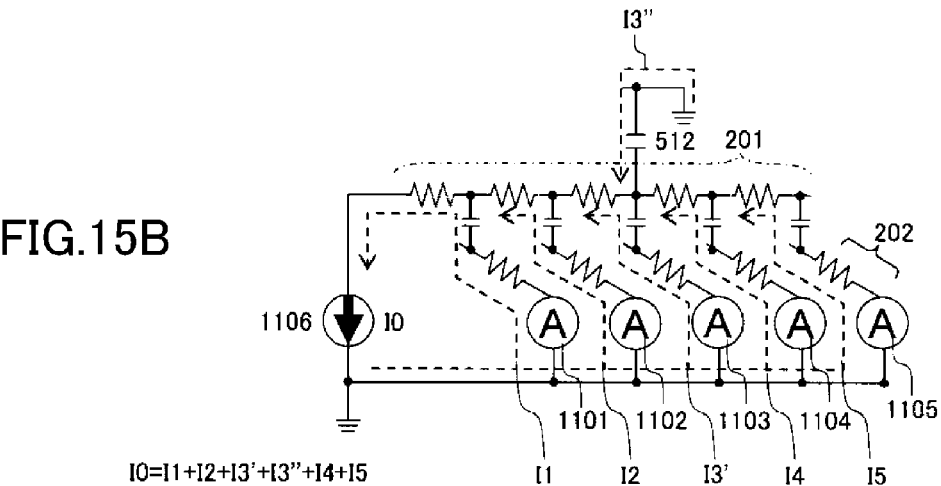
Figure 15C:
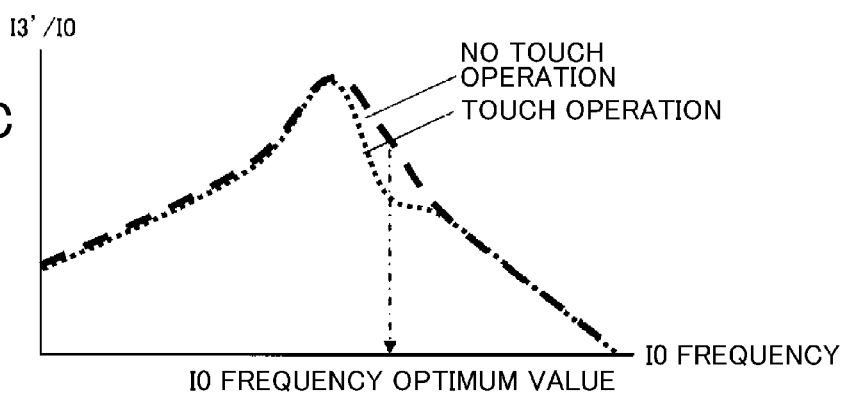

FIG. 15A to FIG. 15C are diagrams illustrating the detection principal of the touch panel 301 of the embodiment of the present invention.

FIG. 15A is a circuit diagram illustrating the equivalent circuit of the touch panel 301 of the embodiment of the present invention in the state in which a touch operation is not performed, and is the same diagram as that of FIG. 12B.

FIG. 15B is a circuit diagram illustrating the equivalent circuit of the touch panel 301 of the embodiment of the present invention in the state in which the finger 502 has approached the touch panel 301, and is the same diagram as that of FIG. 13B.

FIG. 15C is a graph showing a relationship between a current generation frequency of the constant current source 1106 and the detection sensitivity.

The approach of the finger 502 with respect to the touch panel 301 of this embodiment changes transfer characteristics of a measuring system. Therefore, as shown in FIG. 15C, at a specific frequency, the change is remarkably reflected to the current variation.

In this embodiment, the constant current source 1106 is set so as to generate a current at such an optimum frequency.

Figure 16A:
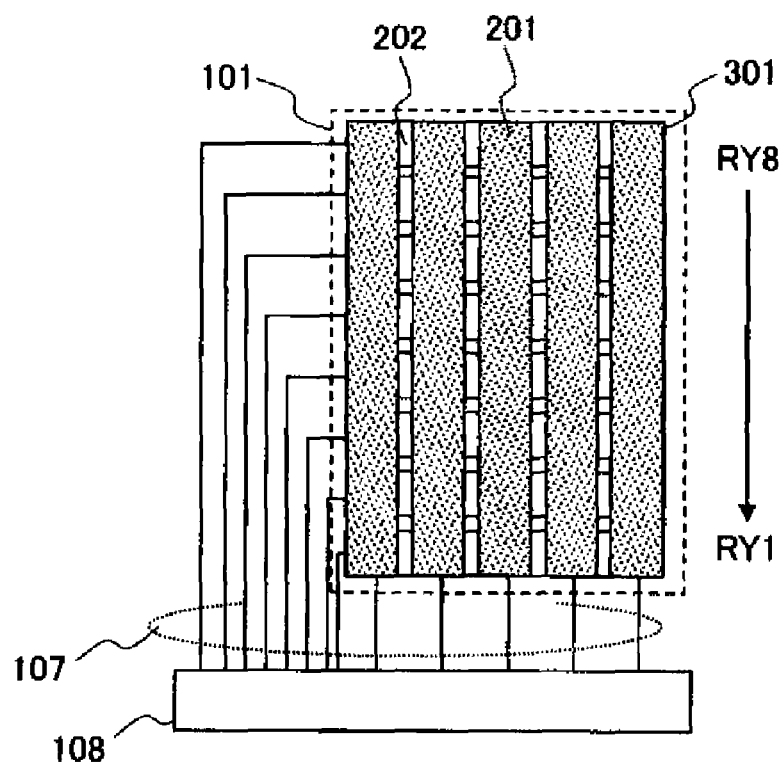
FIGS. 16A and 16B are diagrams illustrating an example of detection results obtained from the touch panel of the embodiment of the present invention.
Figure 16B:
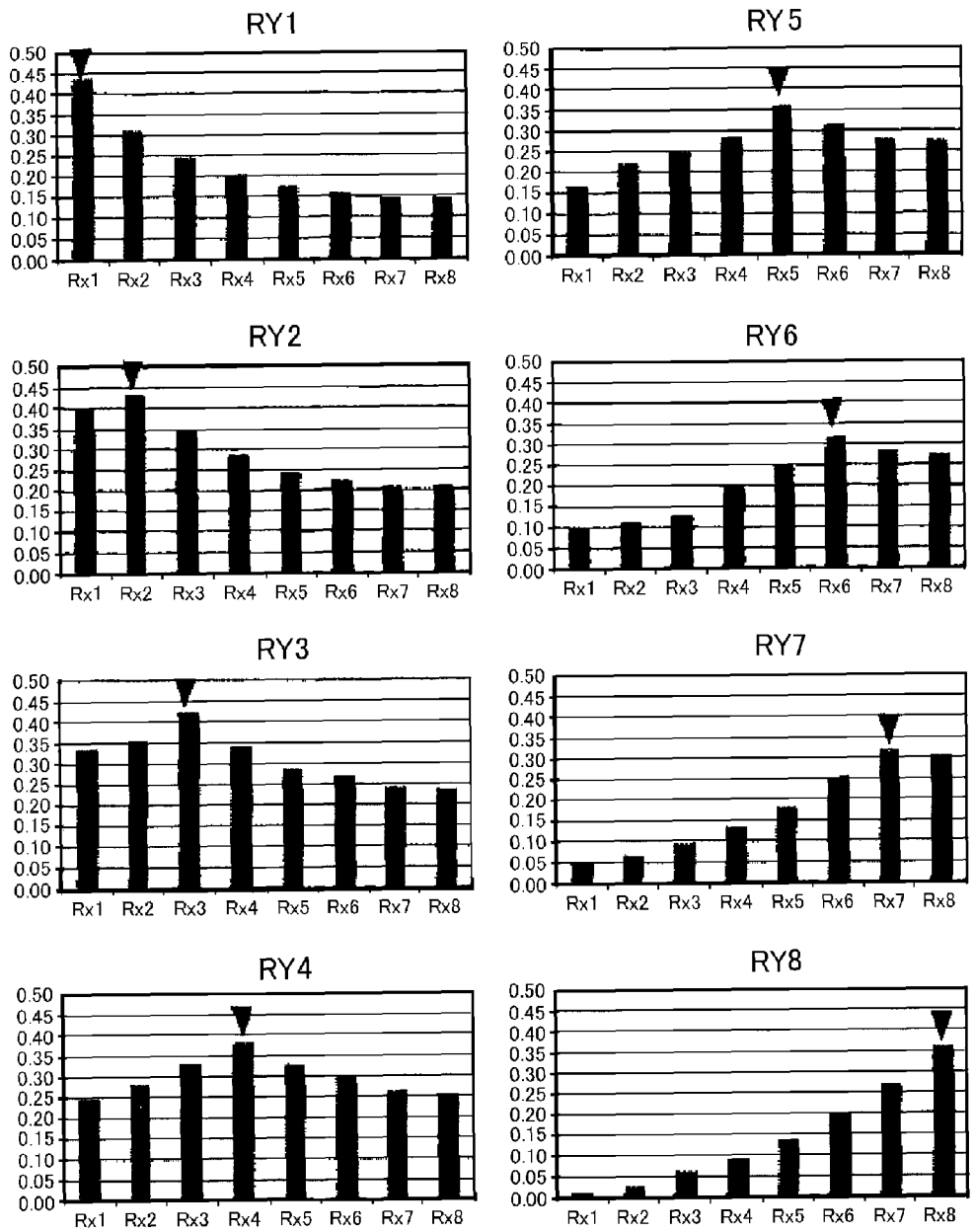

FIGS. 16A and 16B are diagrams illustrating an example of detection results obtained from the touch panel 301 of the embodiment of the present invention.

FIG. 16A is a diagram illustrating that the contact position of the finger 502 sequentially moves from the Y electrode 202 of RY1 to the Y electrode 202 of RY8.

FIG. 16B is a graph showing detection signals detected from the Y electrodes 202 of RY1 to RY8 in a state in which the contact position of the finger 502 has sequentially moved from the Y electrode 202 of RY1 to the Y electrode 202 of RY8.

As shown in FIG. 16B, it is understood that, in accordance with the movement of the contact position of the finger 502, the detection signals detected from the Y electrodes 202 of RY1 to RY8 vary to a distribution state that is capable of detecting the contact position of the finger 502.

Figure 17A:
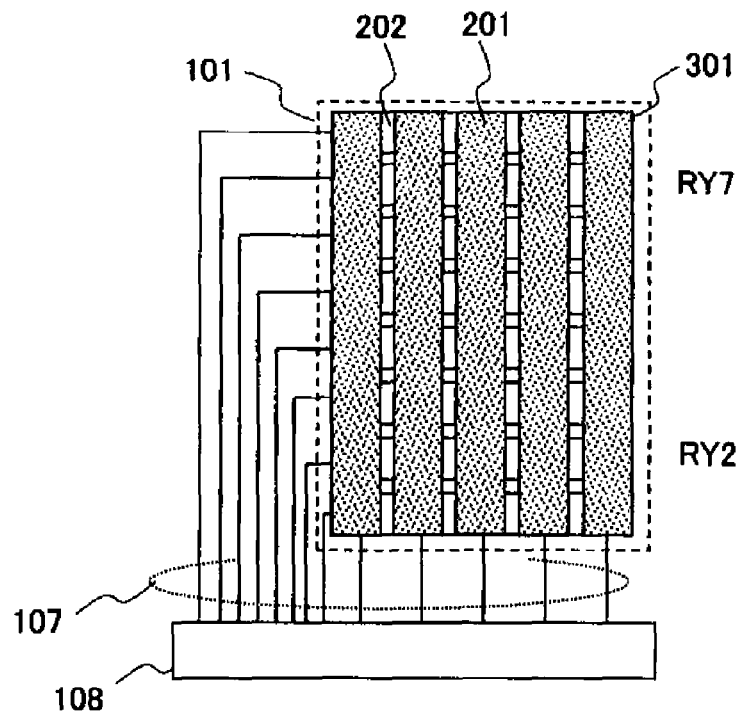
FIGS. 17A and 17B are diagrams illustrating another example of the detection results obtained from the touch panel of the embodiment of the present invention.
Figure 17B:
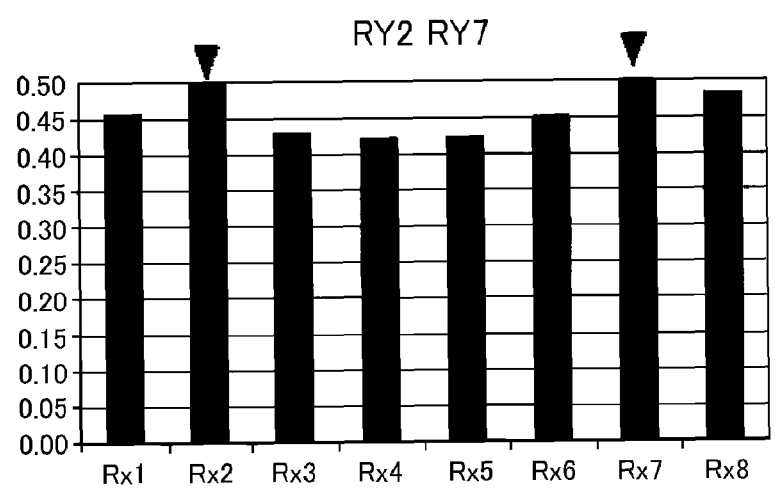

FIGS. 17A and 17B are diagrams illustrating another example of the detection results obtained from the touch panel 301 of the embodiment of the present invention.

FIG. 17A is a diagram illustrating that the finger 502 is simultaneously held in contact to the Y electrodes 202 of RY2 and RY7.

FIG. 17B is a graph showing detection signals detected from the Y electrodes 202 of RY1 to RY8 in the state in which the finger 502 is simultaneously held in contact to the Y electrodes 202 of RY2 and RY7.

As shown in FIG. 17B, it is understood that, in the state in which the finger 502 is simultaneously held in contact to the Y electrodes 202 of RY2 and RY7, a signal distribution corresponding to the two simultaneous contact positions is obtained. In this manner, even when contact is made at a plurality of points on the same surface, the coordinates of the respective points can be calculated.

Note that, in the above-mentioned embodiment, description is made of a case where the present invention is applied to a display device with a built-in touch panel, but the present invention is not limited to the above-mentioned embodiment. It should be understood that the present invention is applicable to a touch panel including a plurality of X electrodes and a plurality of Y electrodes formed on different surfaces, in which the plurality of X electrodes and the plurality of Y electrodes are formed on different surfaces across an insulating member.

While the invention made by the inventor of the present invention has been concretely described based on the embodiment, it should be understood that the present invention is not limited to the embodiment and various modifications may be made thereto without departing from the gist of the invention.

What is claimed is:
1. A touch panel, comprising:
    a plurality of scanning electrodes;
    a plurality of detecting electrodes intersecting with the plurality of scanning electrodes;
    a detection signal source which sequentially connects a constant current source to each of the plurality of scanning electrodes for each one scanning period; and
    a detection circuit which detects a touch position on the touch panel based on a variation of a current detected at each of the plurality of detecting electrodes;
    wherein, even in a case where a new current passage occurs, the constant current source operates to generate a total current amount which is constant; and
    wherein the detection circuit detects a touch position by detecting the detecting electrode to which an amount of current flowing is reduced due to the new current passage.
2. The touch panel according to claim 1, wherein the plurality of scanning electrodes and the plurality of detecting electrodes are formed on different surfaces.

3. The touch panel according to claim 1, wherein the plurality of scanning electrodes and the plurality of detecting electrodes are formed on different surfaces across an insulating member.

4. The touch panel according to claim 1, wherein the plurality of scanning electrodes and the plurality of detecting electrodes each comprise a stripe-type electrode.

5. The touch panel according to claim 4, wherein an electrode interval between the plurality of scanning electrodes and an electrode interval between the plurality of detecting electrodes are each at least 20 μm and no greater than 30 μm.

6. The touch panel according to claim 1, further comprising a frequency adjustor which adjusts a frequency of the constant current source.

7. A display device with a built-in touch panel, comprising:
a display panel; and
a touch panel built into the display panel,
wherein the touch panel comprises:
   a plurality of scanning electrodes formed on the display panel;
   a plurality of detecting electrodes intersecting with the plurality of scanning electrodes, the plurality of detecting electrodes being formed on the display panel;
   a detection signal source which sequentially connects a constant current source to each of the plurality of scanning electrodes for each one scanning period; and
   a detection circuit which detects a touch position on the display panel based on a variation of a current detected at each of the plurality of detecting electrodes;
wherein, even in a case where a new current passage occurs, the constant current source operates to generate a total current amount which is constant; and
wherein the detection circuit detects a touch position by detecting the detecting electrode to which an amount of current flowing is reduced due to the new current passage.

8. The display device with a built-in touch panel according to claim 7, wherein the plurality of scanning electrodes and the plurality of detecting electrodes are formed on different surfaces.

9. The display device with a built-in touch panel according to claim 7,
wherein one of the each of the plurality of scanning electrodes and the each of the plurality of detecting electrodes is formed on a surface of the display panel on a viewer side, and
wherein another of the each of the plurality of scanning electrodes and the each of the plurality of detecting electrodes is formed inside the display panel.

10. The display device with a built-in touch panel according to claim 7,
wherein the display panel comprises a liquid crystal display panel comprising:
   a first substrate;
   a second substrate; and
   a liquid crystal layer sandwiched between the first substrate and the second substrate,
wherein the second substrate is arranged on a viewer side,
wherein one of the each of the plurality of scanning electrodes and the each of the plurality of detecting electrodes is formed on a surface of the second substrate on a side opposite to the liquid crystal layer, and
wherein another of the each of the plurality of scanning electrodes and the each of the plurality of detecting electrodes is formed on a surface of the first substrate on the liquid crystal layer side.

11. The display device with a built-in touch panel according to claim 7, wherein the plurality of scanning electrodes and the plurality of detecting electrodes each comprise a stripe-type electrode.

12. The display device with a built-in touch panel according to claim 11, wherein an electrode interval between the plurality of scanning electrodes and an electrode interval between the plurality of detecting electrodes are each at least 20 μm and no greater than 30 μm or less.

13. The display device with a built-in touch panel according to claim 7, further comprising a frequency adjustor which adjusts a frequency of the constant current source.

* * * * *